United States Patent
West et al.

(10) Patent No.: US 10,101,070 B2
(45) Date of Patent: Oct. 16, 2018

(54) AXIAL THRUST CONTROL FOR ROTARY COMPRESSORS

(71) Applicant: TRANE INTERNATIONAL INC.

(72) Inventors: Nathan Thomas West, Holmen, WI (US); Dennis Myron Beekman, LaCrosse, WI (US); David Marshall Foye, LaCrosse, WI (US); Korwin Jay Anderson, Onalaska, WI (US); Benjamin James Sykora, Holmen, WI (US)

(73) Assignee: Trane International Inc., Davidson, NC (US)

(*) Notice: Subject to any disclaimer, the term of this patent is extended or adjusted under 35 U.S.C. 154(b) by 49 days.

(21) Appl. No.: 15/443,287

(22) Filed: Feb. 27, 2017

(65) Prior Publication Data

US 2017/0167769 A1 Jun. 15, 2017

Related U.S. Application Data

(62) Division of application No. 14/168,346, filed on Jan. 30, 2014, now Pat. No. 9,605,886.

(Continued)

(51) Int. Cl.
| | |
|---|---|
| F04B 49/00 | (2006.01) |
| F25B 49/02 | (2006.01) |
| F25B 1/04 | (2006.01) |
| F04C 18/02 | (2006.01) |
| F04C 28/06 | (2006.01) |

(Continued)

(52) U.S. Cl.
CPC ........ F25B 49/022 (2013.01); F04C 18/0215 (2013.01); F04C 28/06 (2013.01); F04C 28/08 (2013.01); F25B 1/04 (2013.01); F04B 49/065 (2013.01); F04B 49/20 (2013.01); F04D 27/0261 (2013.01); F25B 2600/021 (2013.01); F25B 2700/1931 (2013.01);
(Continued)

(58) Field of Classification Search
CPC .... F25B 1/04; F25B 49/022; F25B 2600/021; F25B 2700/1931; F25B 2700/1933; F25B 2700/21151; F25B 2700/21152; Y02B 30/741; F04B 40/065; F04B 40/20; F04D 27/0261; F04C 18/0215; F04C 18/06; F04C 18/08

See application file for complete search history.

(56) References Cited

U.S. PATENT DOCUMENTS 4,964,790 A * 10/1990 Scott ................... F04C 29/0021
418/1
5,135,374 A    8/1992 Yoshimura et al.
(Continued)

Primary Examiner — Charles Freay
(74) Attorney, Agent, or Firm — Taft Stettinius & Hollister LLP

(57) ABSTRACT

Systems and methods are used to control operation of a rotary compressor of a refrigeration system to limit or prevent movement of rotors due to axial thrust loading resulting from rapid changes in speed of the rotors of the compressor. The operational profile of the motor is controlled to maintain acceleration torque and deceleration torque within predefined limits. The acceleration torque and deceleration torque are maintained within the predefined limits by controlling the speed of the motor, or by controlling the torque applied by the motor to the rotors during acceleration or deceleration.

11 Claims, 3 Drawing Sheets

Related U.S. Application Data

(60) Provisional application No. 61/758,399, filed on Jan. 30, 2013.

(51) Int. Cl.
  *F04C 28/08* (2006.01)
  *F04B 49/20* (2006.01)
  *F04B 49/06* (2006.01)
  *F04D 27/02* (2006.01)

(52) U.S. Cl.
  CPC ............... *F25B 2700/1933* (2013.01); *F25B 2700/21151* (2013.01); *F25B 2700/21152* (2013.01); *Y02B 30/741* (2013.01)

(56) References Cited

U.S. PATENT DOCUMENTS

| | | | |
|---|---|---|---|
| 5,545,019 A * | 8/1996 | Beck | F04C 18/0215 188/82.1 |
| 5,626,470 A | 5/1997 | Gerhardt | |
| 5,678,987 A * | 10/1997 | Timuska | F04C 18/16 418/203 |
| 5,707,223 A | 1/1998 | Englund et al. | |
| 5,911,924 A | 6/1999 | Siegrist | |
| 6,217,304 B1 | 4/2001 | Shaw | |
| 6,506,031 B2 * | 1/2003 | Sishtla | F04C 18/16 417/365 |
| 6,506,038 B2 | 1/2003 | Sjoholm et al. | |
| 7,600,981 B2 * | 10/2009 | Lau | F04D 27/0269 417/2 |
| 8,365,544 B2 * | 2/2013 | Foye | F04C 18/16 417/19 |
| 8,890,461 B2 | 11/2014 | Knox | |
| 9,605,886 B2 * | 3/2017 | West | F25B 49/022 |
| 9,733,002 B2 * | 8/2017 | Foye | F04C 18/16 |
| 2011/0041533 A1 * | 2/2011 | Foye | F04C 18/16 62/228.1 |
| 2014/0216081 A1 | 8/2014 | West et al. | |

\* cited by examiner

AXIAL THRUST CONTROL FOR ROTARY COMPRESSORS

RELATED APPLICATIONS

This application is a divisional of U.S. patent application Ser. No. 14/168,346 entitled Axial Thrust Control for Rotary Compressors filed on Jan. 30, 2014, which claims the benefit of the filing date of U.S. Provisional Application Ser. No. 61/758,399 filed on Jan. 30, 2013, each of which is incorporated herein by reference for all purposes.

BACKGROUND

Compressors in refrigeration systems raise the pressure of a refrigerant from an evaporator pressure to a condenser pressure. The evaporator pressure is sometimes referred to as the suction pressure and the condenser pressure is sometimes referred to as the discharge pressure. Many types of compressors, including screw compressors and scroll compressors, are used in such refrigeration systems. Such compressors are generally referred to herein as rotary compressors.

A rotary compressor includes a suction port and a discharge port that open into a working chamber of the compressor. For screw compressors, the working chamber includes a pair of meshed screw rotors that define a compression pocket between the screw rotors and interior walls of the working chamber. Refrigerant is received by the suction port and delivered to the compression pocket. Rotation of the rotors closes the compression pocket from the suction port and decreases the volume of the compression pocket as the rotors move the refrigerant toward the discharge port. Due to decreasing the volume of the compression pocket, the rotors deliver the refrigerant to the discharge port at a discharge pressure that is greater than the suction pressure.

For scroll compressors, the working chamber includes two spiral rotors interlocking with one another. One of the rotors is fixed and the other is driven by a motor to rotate relative to and against the sides of the other rotor. This generates suction, creating pockets of refrigerant that progress from the suction side around the rotors air and compress as they move toward the center of the rotors, where the refrigerant is then forced to the discharge port.

In addition to these general operational characteristics of rotary compressors in which the compression and movement of fluid produces axial thrust forces, rapid changes in rotational velocity of the rotors can cause axial rotor movement or thrust. If the rotors travel too far, they can contact surfaces of the compressor that were not intended to contact the rotors. As a result, the potential for failure and excessive wear of these components is created by axial movement of the rotors. While these thrust forces can be counter-acted by bearings, large thrust forces tend to cause wear of the thrust bearings, increase the loading on the compressor, and reduce reliability of the compressor and bearings over time. Therefore, further improvements in methods and systems for controlling axial thrust forces during operation of rotary compressors are desirable.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Embodiments of refrigeration systems, compressor systems and methods to control rotary compressors of such systems to limit or avoid axial movement of the rotors due to axial thrust loads during certain operating conditions are disclosed. An embodiment of a method and system includes controlling operation of a rotary compressor of a refrigeration system by controlling the acceleration and/or deceleration torque of the rotors according to predefined acceleration/deceleration limits when changing the speed or velocity of the compressor. Embodiments of the method and system include controlling the speed of the motor driving the compressor to maintain changes in speed of the motor within predefined acceleration/deceleration limits, and controlling the acceleration torque and deceleration torque applied by the motor in changing the speed or velocity of the compressor within predefined acceleration/deceleration limits. The method and system may also include driving the rotary compressor within the predefined acceleration/deceleration limits. Embodiments of refrigeration systems and/or compressor systems suitable for implementing disclosed embodiments of controlling operation of the rotary compressor are also presented. Further embodiments, forms, objects, features, advantages, aspects, and benefits shall become apparent from the following description and figures.

DETAILED DESCRIPTION

Figure 1:
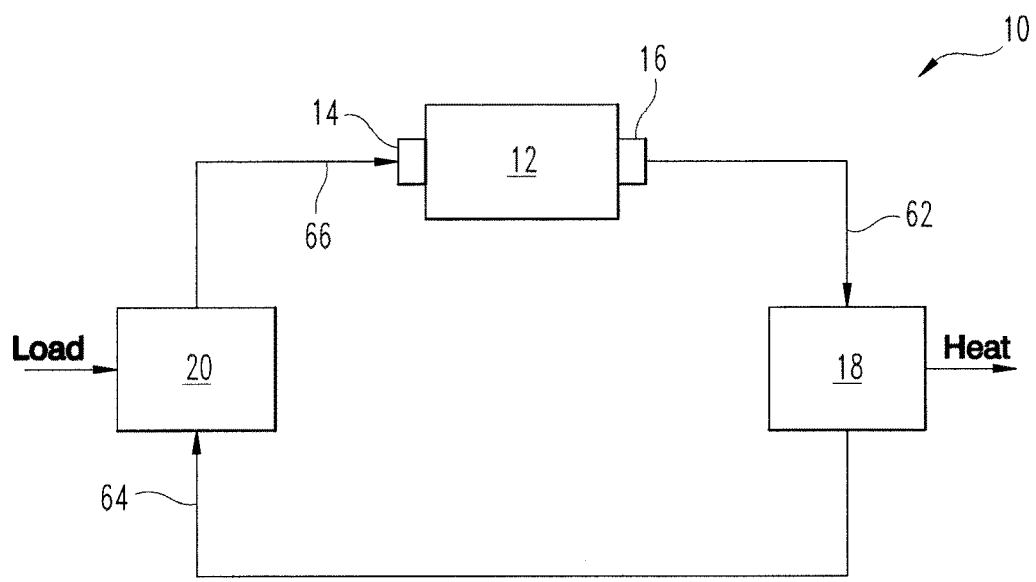
FIG. 1 shows an embodiment of a refrigeration system that includes a compressor system.

FIG. 1 depicts one embodiment of a refrigeration system 10. The refrigeration system 10 may circulate a fluid such as, for example, a refrigerant, as indicated by arrows 62, 64, 66 in order to receive a cooling load and remove the heat from the load for rejection elsewhere. As shown, the refrigeration system 10 includes a compressor system 12, a condenser system 18 coupled to the compressor system 12, and an evaporator system 20 coupled between the compressor system 12 and the condenser system 18. Other components and systems may also be provided, such as expansion valves, economizers, pumps, and the like as would be understood by those of ordinary skill in the art.

The compressor system 12 may include a suction port 14 and a discharge port 16. As known to those skilled in the art, the suction port 14 of compressor system 12 receives the fluid in a first thermodynamic state, and the compressor system 12 compresses the fluid and transfers the fluid from the suction port 14 to the discharge port 16 at a higher discharge pressure and a higher discharge temperature. The fluid discharged from the discharge port 16 may be in a second thermodynamic state having a temperature and pressure at which the fluid may be readily condensed with cooling air or cooling liquid in condenser system 18. The condenser system 18 receives the compressed fluid from discharge port 16 of the compressor system 12 and cools the compressed fluid as it passes through the condenser system 18. The condenser system 18 may include coils or tubes through which the compressed fluid passes and across which cool air or cool liquid flows to reject heat to the air or other medium.

The evaporator system 20 receives the cooled fluid from the condenser system 18 after passing through any intervening expansion valve and/or economizer and routes the cold fluid through coils or tubes of the evaporator system 20. Warm air or liquid providing a load is circulated from the space to be cooled across the coils or tubes of the evaporator system 20. The warm air or liquid passing across the coils or tubes of the evaporator system 20 causes a liquid portion of the cold fluid to evaporate. At the same time, the warm air or liquid passed across the coils or tubes may be cooled by the fluid, thus lowering the temperature of the space to be cooled. The evaporator system 20 then delivers the evaporated fluid to the suction port 14 of the compressor system 12 as a saturated vapor. The evaporator system 20 completes the refrigeration cycle and returns the fluid to the compressor system 12 to be recirculated again through the compressor system 12, condenser system 18, and evaporator system 20.

Figure 2:
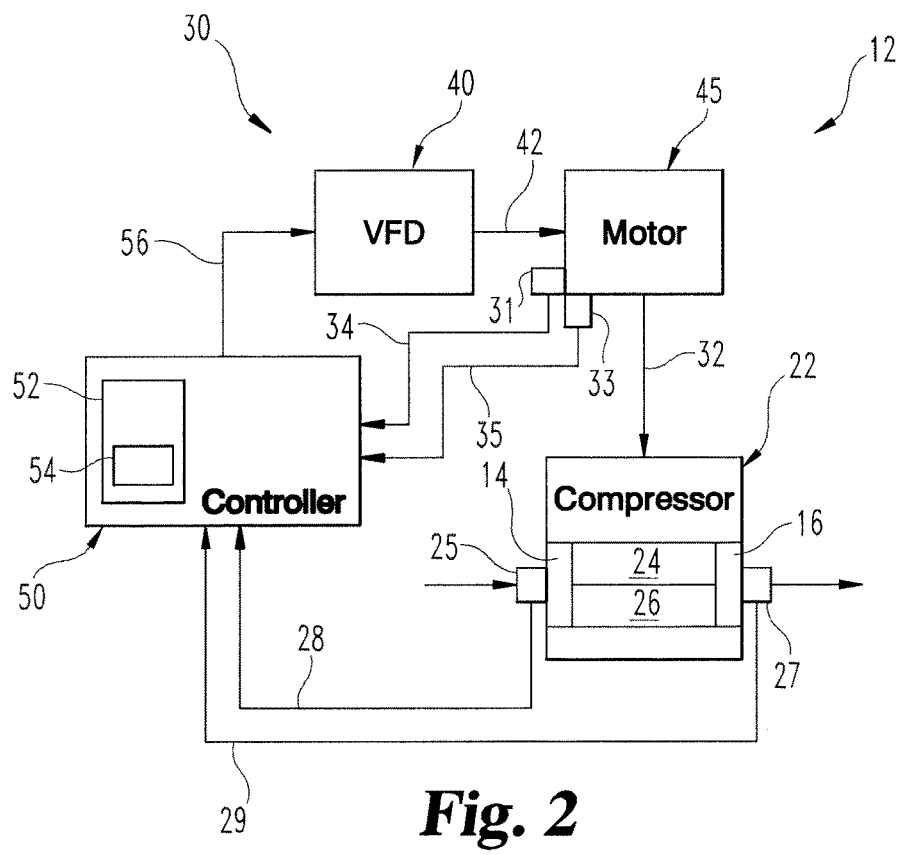
FIG. 2 shows additional details of the compressor system of FIG. 1.

Referring to FIG. 2, further details of one embodiment of the compressor system 12 are shown. The compressor system 12 may include a controller 50, a memory 52 as part of or connected to controller 50, an electric motor system 30, and a rotary compressor 22. Electric motor system 30 is connected to rotary compressor 22 with a shaft 32 that drives rotors 24, 26 in response to operation of motor system 30. The compressor system 12 may further include one or more electrical sensors 31 and torque sensors 33 associated with motor system 30 that transmit signals to controller 50 via communications links 34 and 35, respectively. Compressor system 12 may also include suction pressure and/or temperature sensors 25, and discharge pressure and/or temperature sensors 27, associated with compressor 22 that transmit signals to controller 50 via communications links 28 and 29, respectively. The sensors 25, 27, 31, 33 provide operational parameters 104 (FIG. 3) of the motor system 30 and compressor 22 with measurements that are indicative of the operation of the compressor 22. Furthermore, the sensors 25, 27, 31, 33 can be connected to controller 50 via a wired connection, wireless connect, and combinations thereof. In addition, sensors 25, 27, 31, 33 can be virtual sensors.

The controller 50 may include processors, microcontrollers, analog circuitry, digital circuitry, firmware, and/or software that cooperate to control operation of the motor system 30 and the rotary compressor 22. The memory 52 may be a part of controller 50 or a separate device, and comprise non-volatile memory devices such as flash memory devices, read only memory (ROM) devices, electrically erasable/programmable ROM devices, and/or battery backed random access memory (RAM) devices to store an array of acceleration/deceleration limits 54 for the operation of motor system 30 and rotary compressor 22. The memory 52 may further include instructions which the controller 50 may execute in order to control the operation of motor system 30 and the rotary compressor 22.

Some aspects of the described systems and techniques may be implemented in hardware, firmware, software, or any combination thereof. Some aspects of the described systems may also be implemented as instructions stored on a machine readable medium which may be read and executed by one or more processors. A machine readable medium may include any storage device to which information may be stored in a form readable by a machine (e.g., a computing device). For example, a machine readable medium may include read only memory (ROM); random access memory (RAM); magnetic disk storage media; optical storage media; flash memory devices; and others.

As explained in more detail below, the controller 50 may receive operational signals from one or more sensors 25, 27, 31, 33 of the compressor system 12 that provide information regarding operation parameters of the motor system 30 and the rotary compressor 22. Based upon the operational signals, the controller 50 may determine an operating mode of the rotary compressor 22 and may generate, based upon the determined operating mode and/or operating point, one or more command signals 56 that command an operating parameter of motor system 30 and/or rotary compressor 22 and an accompanying command signal profile that controls the operation of the motor system 30 and rotary compressor 22 over time to meet the command. In particular, the controller 50 in one embodiment may select an acceleration/deceleration limit from the array of acceleration/deceleration limits 54 stored in memory 52 or may otherwise determine an acceleration/deceleration limit for the rotary compressor 22 based upon the operating mode determined from the operational signals. The controller 50 may then generate command signals 56 that request the electric motor system 30 to deliver a particular speed to the rotary compressor 22 via a command signal profile that is governed by the acceleration/deceleration limit 54 selected based on the operating mode of the rotary compressor 22.

The electric motor system 30 drives the rotary compressor 22 in response to command signals 56 received from the controller 50 according to the command signal profile. In the illustrated embodiment, the electric motor system 30 includes a variable frequency drive 40 and an electric motor 45. The electric motor 45 is coupled to the rotary compressor 22 via shaft 32 to drive rotors 24, 26 of the rotary compressor 22 that extend axially between ports 14, 16. In one embodiment, the electric motor 45 includes a permanent magnetic motor that drives the rotors 24, 26 at a speed that is dependent upon the frequency of polyphase control signals 42 and at a torque that is dependent upon the electric current supplied by the polyphase control signals 42. The variable frequency drive 40 receives command signals 56 from the controller 50 and generates and adjusts the polyphase phase control signals 42 according to the command signal profile that is governed by the selected acceleration/deceleration limit 54. In particular, the variable frequency drive 40 adjusts the frequency and electric current of the polyphase control signals 42 based upon the command signal profile of command signals 56 received from the controller 50. As mentioned above, the controller 50 may generate the command signal profile that is governed by an acceleration/deceleration limit selected for the rotary compressor 22. As such, the variable frequency drive 40 in response to the command signal profile adjusts at least one of the frequency and current of the control signals 42 in a manner that satisfies the acceleration/deceleration limit selected for the rotary compressor 22 in order to meet the command signal 56 over time.

As shown, the electrical sensor 31 is positioned proximate the electric motor 45 to sense electrical operating characteristics of the electric motor 45. The electrical sensor 31 may further provide operational signals via communications link 34 with measurements that are indicative of the sensed electrical operating characteristics. In one embodiment, the electrical sensor 31 includes one or more current sensors. The current sensors may be positioned to sense the electric current supplied by the control signals 42 to the electric motor 45 and may generate operational signals that are indicative of the sensed electric current. In one embodiment, the torque produced by the electric motor 45 is dependent upon the electric current supplied by the control signals 42. Accordingly, operational signals indicative of the electric current supplied to the electric motor 45 are also be indicative of the torque supplied by the electric motor 45. While the electrical sensor 31 in one embodiment comprises current sensors that sense current supplied to the electric motor 45, the electrical sensor 31 may sense other electrical operating characteristics of the electric motor 45 such as voltages, currents, phase angles, frequencies, effective impedances at the input and/or other parts of the electric motor 45 and provide operational signals indicative of the sensed electrical operating characteristics.

As shown, the torque sensor 33 may be positioned proximate the electric motor system 30 to sense torque applied by the electric motor system 30 to the rotary compressor 22. The torque sensor 33 may further provide operational signals with measurements that are indicative of the sensed torque. In one embodiment, the torque sensor 33 may include one or more torsion elements positioned between the electric motor 45 and the rotary compressor 22. The torque sensor 33 may then generate operational signals indicative of the torque generated by and/or applied to the torsion elements. In addition, the suction pressure and/or temperature sensor 25 are positioned proximate the suction port 14 of the rotary compressor 22 to sense pressure and/or temperature of the fluid entering the suction port 14. Likewise, the discharge pressure and/or temperature sensor 27 may be positioned proximate the discharge port 16 of the rotary compressor 22 to sense pressure and/or temperature of the fluid discharged from the discharge port 16. The suction pressure and/or temperature sensors 25, 27 provide operational signals with measurements that are indicative of the sensed pressure and/or temperature of the fluid entering the suction port 14 and the discharge port 16, respectively.

In one embodiment, rotary compressor 22 is a screw compressor that includes a plurality of meshed screw type rotors 24, 26. The meshed screw rotors 24, 26 define one or more compression pockets between the rotors 24, 26 and interior chamber walls of the compressor 22. The torque supplied by the electric motor 45 rotates the screw rotors 24, 26, thus closing the compression pocket from the suction port 14. Rotation of the rotors 24, 26 further decreases the volume of the compression pocket as the rotors 24, 26 move the fluid toward the discharge port 16. Due to decreasing the volume of the compression pocket, the rotors 24, 26 deliver the fluid to the discharge port 16 at a discharge pressure that is greater than the suction pressure and at a discharge temperature that is greater than the suction temperature. In another embodiment, rotary compressor 22 includes scroll-type rotors that compress and advance the fluid from suction port 14 to discharge port 16.

The operation of the rotary compressor 22 in compressing and moving the fluid produces axial thrust forces which may cause axial movement of rotors 24, 26 against chamber walls, bearings, and end surfaces of the screw compressor 22. While thrust bearings and lubricating oil provides some resistance and cushioning for the chamber walls, rotors 24, 26, and bearings of the rotary compressor 22, under certain operating conditions the axial thrust loads and/or movement may produce undesirable results, such as increased wear, decreased reliability, and potential failure. In selecting appropriate acceleration/deceleration limits for operation of the rotary compressor 22, the controller 50 drives the rotary compressor 22 in a manner which reduces or eliminates the non-productive axial thrust forces to at least limit if not prevent axial movement of the rotors under the controlled operating conditions. In one embodiment, an allowable axial thrust load on rotors 24, 26 is determined that would maintain axial movement of the rotors 24, 26 within desired limits. The allowable acceleration torque and the allowable deceleration torque of rotors 24, 26 is determined based on this allowable axial load. The acceleration/deceleration limits are based on the allowable acceleration and deceleration torques of the rotors so that axial thrust loads that cause undesired axial movement of the rotors are prevented.

Due to the unique operating characteristics of rotary compressor 22 at different operating conditions, beneficial acceleration/deceleration limits 54 can be identified for different operating modes and/or at operating points in such operating modes. For example, the rotary compressor 22 may be operated in any one of a start mode, an accelerating mode, a decelerating mode, and a stop mode, each of which may involve different acceleration/deceleration limits 54 to limit axial thrust and prevent undesired movement of compressor 22. An array of acceleration/deceleration limits 54 for associated operating modes and/or operating points may be established for the rotary compressor 22 and stored in memory 52 of controller 50.

In one embodiment, each acceleration/deceleration limit 54 comprises controlling the amount of accelerating/decelerating torque applied by shaft 32 of motor 45 to compressor 22 by setting direct limits on the incremental acceleration current and the incremental deceleration current supplied by variable frequency drive 40 to motor 45. Acceleration and/or deceleration torque can be varied up to the associated acceleration/deceleration limit 54 for the particular operating mode or point. In another embodiment, acceleration/deceleration limits 54 comprise controlling the speed profile of the compressor 22 by limiting the rates of change in the speed of motor 45 via frequency control signals are no more than separate limit values for the acceleration/deceleration limit 54 for the particular operating mode or point. Acceleration and/or deceleration speed rates of change can be varied up to the associated acceleration/deceleration limit 54 for the particular operating mode or point.

Figure 3:
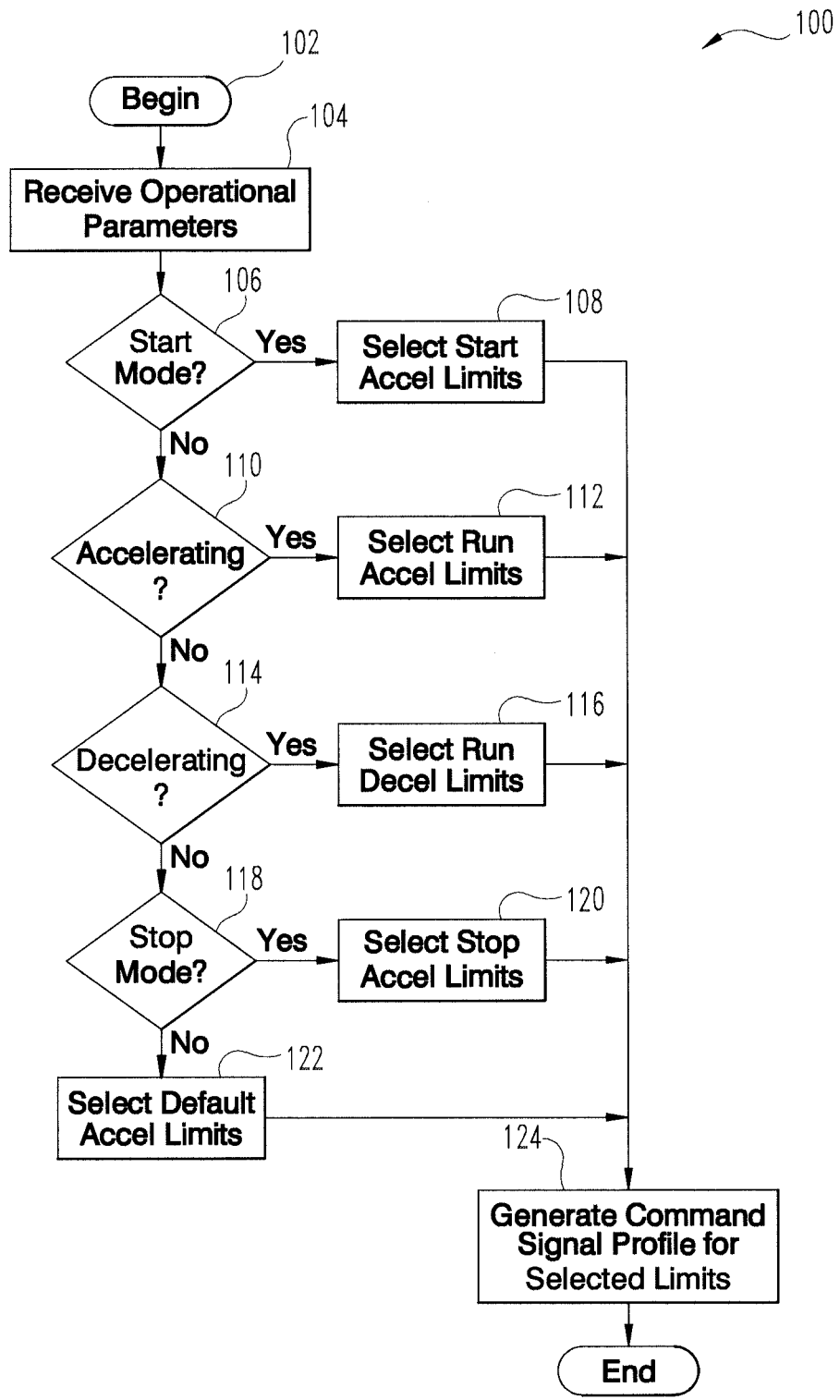
FIG. 3 shows a flowchart of a control method implemented by the compressor system of FIG. 1.

Referring now to FIG. 3, an embodiment of a control method 100 that may be implemented by the controller 50 for operation of compressor system 12 is shown. The controller 50 in one embodiment continuously executes the control method 100 of FIG. 3 in order to limit acceleration and/or deceleration of rotary compressor 22 by operation of motor 45 with variable frequency drive 40. Control method 100 begins at 102 upon start of compressor system 12. At operation 104, the controller 50 receives operational parameters from the signals of various sensors 25, 27, 31, 33 of the compressors system 12 that provide information regarding the present operation of motor system 30 and rotary compressor 22. The controller 50 at conditional 106 determines whether the compressor system 12 is in a start mode based upon the operational parameters. The controller 50 may also determine whether the compressor system 12 is in a start mode based upon other data of the refrigeration system 10. For example, the controller 50 may determine that the compressor system 12 is in a start mode in response to a signal from a control panel or thermostat (not shown) that indicates the controller 50 is to turn on the refrigeration system 10 and start the rotary compressor 22. In response to determining that the compressor system 12 is in a start mode, the controller 50 selects at operation 108 a start acceleration limit from the acceleration/deceleration limits 54 stored in memory 52 that governs the compressor signal profile by providing a limit to the acceleration torque of rotary compressor 22 as it increases from a zero speed to a starting speed.

In response to determining that the compressor system 12 is not in a start mode at conditional 106, the controller 50 determines at conditional 110 whether the rotary compressor 22 is in an accelerating mode based upon the operational signals, and/or based upon control commands indicating that the rotation speed of the rotors 24, 26 is to increase. In one embodiment, the controller 50 determines whether the rotary compressor 22 is to accelerate based upon a comparison of a current operating speed of compressor 22 to a compressor speed command signal 56 from controller 50. In response to determining that acceleration of the rotary compressor 22 is required, the controller 50 selects at operation 112 a run acceleration limit from the acceleration/deceleration limits 54 stored in memory 52 that governs the compressor signal profile by providing a limit to the acceleration torque of rotary compressor 22 from its current operating speed to the speed required by the compressor speed command signal 56 from controller 50.

In response to determining that the rotary compressor 22 is not in a start mode or accelerating mode, the controller 50 at conditional 114 determines whether the rotary compressor 22 is in a decelerating mode based upon the operational signals, and/or based upon control commands indicating that the rotation speed of the rotors 24, 26 is to decrease. In one embodiment, the controller 50 determines whether the rotary compressor 22 is to decelerate based upon a comparison of a current operating speed of compressor 22 to a compressor speed command signal 56 from controller 50. In response to determining that deceleration of the rotary compressor 22 is required, the controller 50 selects at operation 116 a run deceleration limit from the acceleration/deceleration limits 54 stored in memory 52 that governs the compressor signal profile by providing limits to the deceleration torque of rotary compressor 22 from its current operating speed to the speed required by the compressor speed command from controller 50.

In response to determining that the rotary compressor 22 is not in a start mode, an accelerating mode, or a decelerating mode, the controller 50 at conditional 118 determines whether compressor system 12 is in a stop mode. The controller 50 receives operational signals from various sensors 25, 27, 31, 33 of the compressors system 12 that provide information regarding the present operation of motor system 30 and rotary compressor 22 and to determine if compressor system 12 is to initiate a stop mode based upon data supplied by the operational signals. The controller 50 may also determine whether the compressor system 12 is in a stop mode based upon other data of the refrigeration system 10. For example, the controller 50 may determine that the compressor system 12 is in a stop mode in response to a signal from a control panel or thermostat (not shown) that indicates the controller 50 is to turn off the refrigeration system 10 and stop the rotary compressor 22. In response to determining that the compressor system 12 is in a stop mode, the controller 50 selects at operation 120 a stop deceleration limit from the acceleration/deceleration limits 54 stored in memory 52 that governs the compressor signal profile by providing limits of the deceleration of rotary compressor 22 from its current speed to a zero speed.

In response to determining that the compressor system 12 and rotary compressor 22 are not in a start mode, an accelerating mode, a decelerating mode, or a stop mode, the controller 50 at operation 122 selects default acceleration/deceleration limits that are applied during periods of relatively stable or steady operation in which the rotation speed of the rotors 24, 26 is relatively constant. The default acceleration/deceleration limits can be provided to limit sudden changes in compressor speed and torque while allowing various threshold levels to ensure that minor fluctuations in the rotation speed and torque are allowed without a mistaken determination that the rotary compressor 22 is operating in an acceleration mode or deceleration mode.

Figure 4:
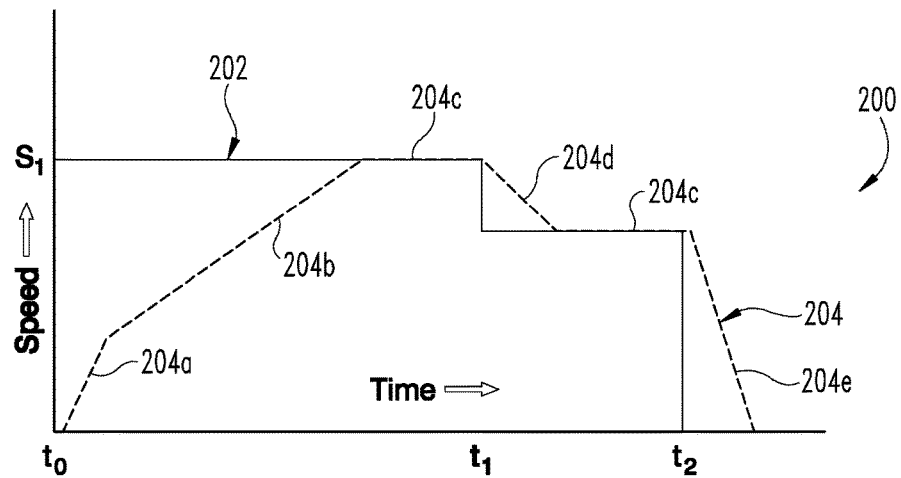
FIG. 4 is a graph of compressor speed commands and a compressor speed profile to respond to the compressor speed commands that is controlled with acceleration/deceleration limits to limit axial thrust movement of the rotors.

In response to selections 108, 112, 116, 120 of the acceleration/deceleration limits 54 for the particular operating mode 106, 110, 114, 118, 122, the controller 50 at operation 124 generates a command signal profile per the selected limits that limits the changes in speed or the torque of rotary compressor 22 until the compressor speed required by command signal 56 is met by the actual compressor speed. Referring to FIG. 4, a graph 200 provides one example of compressor operation with commands for controlling the rate of change of the speed of compressor 22 over time for the various modes 106, 110, 114, 118, 122 by controlling the frequency at which motor 45 operates with control signals 46 from variable frequency drive 40. The compressor speed command 202 associated with command signal 56 is represented by a solid line. The compressor speed command 202 includes a start command at time $t_0$ to increase the compressor speed from zero speed to a first speed $s_1$. At time $t_1$, the compressor speed command 202 reduces the compressor speed from first speed $s_1$ to a second speed $s_2$. At time $t_3$, the compressor speed command 202 stops operation of compressor 22 by reducing the compressor speed from speed $s_2$ to a zero speed.

Graph 200 further includes a compressor command signal profile 204 that is represented by a dashed line. Compressor command signal profile 204 controls the changes in compressor speed in a manner that is governed by the acceleration/deceleration limits 54 selected according to control method 100 to achieve the compressor speed command 202. For example, compressor command signal profile 204 includes a start acceleration profile 204a that limits the increase of the speed of compressor 22 during starting from a zero speed at time $t_0$ in a manner that is limited by the starting acceleration limits 108. Compressor command signal profile 204 further includes a running acceleration profile 204b that increases the speed of compressor 22 during running of compressor 22 with a running acceleration that is limited by the running acceleration limits 112. The speed of compressor 22 is increased at a rate that is limited by the running acceleration profile 204b until the compressor speed reaches speed $s_1$ of the compressor speed command 202, upon which compressor 22 is operated at a steady speed profile 204c with the default acceleration/deceleration limits 122 until time $t_1$.

At time $t_1$, compressor command signal profile 204 includes a running deceleration profile 204d that decreases the speed of compressor 22 during running of compressor 22 with a running deceleration that is limited by the running deceleration limits 116. The speed of compressor 22 is decreased in a manner that is limited by the running deceleration profile 204d until the compressor speed reaches speed $s_2$ of the compressor speed command 202, upon which compressor 22 is operated at steady speed profile 204c at the default acceleration/deceleration limits 122 until time $t_2$. At time $t_2$, compressor speed command 202 requires stopping of compressor 22. The rate of deceleration of the speed of compressor 22 is limited by stopping deceleration limits 120 as represented by stopping deceleration profile 204e until a zero compressor speed is reached.

Figure 5:
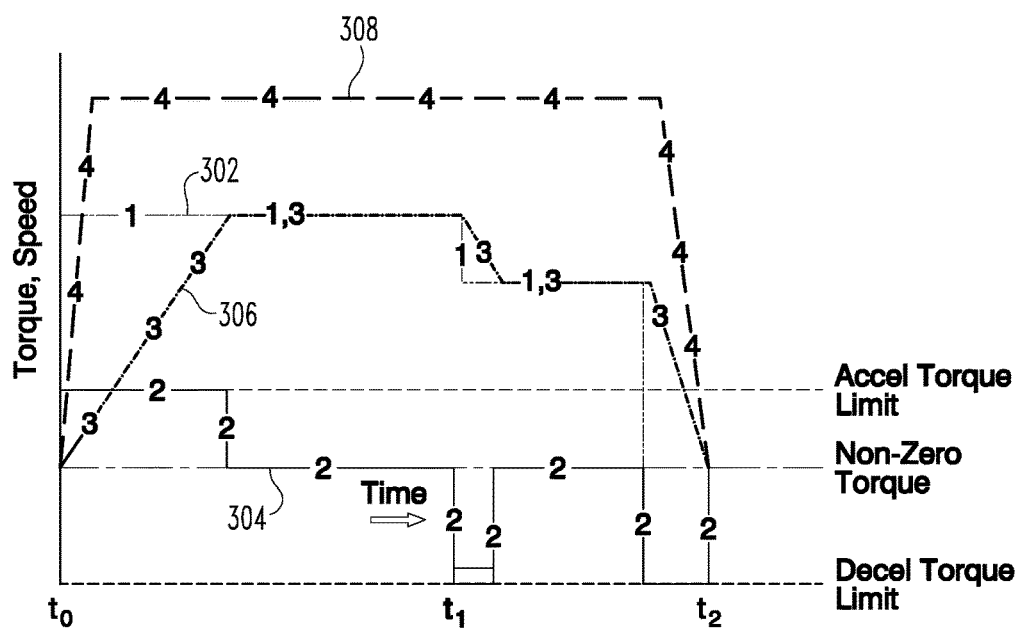
FIG. 5 is a graph of compressor speed commands and a compressor torque and speed profile to respond to the compressor speed commands controlled with acceleration/deceleration limits to limit axial thrust movement of the rotors.

Referring to FIG. 5, a graph 300 provides another example of compressor operation with commands for limiting the amount of torque applied to compressor 22 over time for the various modes 106, 110, 114, 118, and 122 by controlling the current at which motor 45 operates with control signals from variable frequency drive 40. The controller compressor speed command 302 is represented by a line 1 and the compression torque 308 is represented by a line 4. The compressor acceleration/deceleration torque command signal profile 304 is represented by line 2 and is limited by the dashed lines indicating the acceleration torque limit and the deceleration torque limit. At time $t_0$, compressor speed command 302 indicates a request for an increase in compressor speed. The compressor speed 306, represented by line 3, is increased by increasing the torque provided to compressor 22 via acceleration/deceleration torque command signal profile 304 at a rate that is limited by the acceleration torque limit until the compressor speed 306 reaches the controller compressor speed command 302. Similarly, a decrease in compressor speed 306 in response to compressor speed command 302 at time $t_1$ or time $t_2$ results in a deceleration torque being applied to compressor 22 via the acceleration/deceleration torque command signal profile 304 limited by the deceleration torque limit. As shown in FIG. 5 at time $t_1$, the rate of acceleration or deceleration can be less than the limits. The control method represented by FIG. 5 controls the amount of torque used to change compressor speed by placing limits on the acceleration torque and deceleration torque.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method to control operation of a rotary compressor of a refrigeration system, comprising:
   receiving operational signals regarding operation of the rotary compressor of the refrigeration system;
   determining an operating mode of the rotary compressor based upon the received operational signals;
   selecting an acceleration/deceleration limit of the rotary compressor based upon the operating mode, wherein the acceleration/deceleration limit is based on acceleration and deceleration torques that limit axial movement of rotors of the rotary compressor; and
   changing a speed of the rotary compressor while limiting acceleration/deceleration according the acceleration/deceleration limit.

2. The method of claim 1, wherein:
   selecting the acceleration/deceleration limit further comprises selecting a starting acceleration limit for the rotary compressor in response to determining that the rotary compressor is in a start mode; and
   changing the speed of the rotary compressor includes increasing the speed of the rotary compressor from a zero speed while limiting acceleration according to the starting acceleration limit.

3. The method of claim 1, wherein:
   selecting the acceleration/deceleration limit further comprises selecting a running acceleration limit for the rotary compressor in response to determining that the rotary compressor is in an accelerating mode; and
   changing the speed of the rotary compressor includes increasing the speed of the compressor from a current non-zero speed while limiting acceleration according to the running acceleration limit.

4. The method of claim 1, wherein:
   selecting the acceleration/deceleration limit further comprises selecting a running deceleration limit for the rotary compressor in response to determining that the rotary compressor is in a decelerating mode; and
   changing the speed of the rotary compressor includes decreasing the speed of the compressor from a current non-zero speed while limiting deceleration according to the running deceleration limit.

5. The method of claim 1, wherein:
   selecting the acceleration/deceleration limit further comprises selecting a stopping deceleration limit for the rotary compressor in response to determining, that the rotary compressor is in a stop mode; and
   changing the speed of the rotary compressor includes decreasing the speed of the rotary compressor to a zero speed while limiting deceleration according to the stopping deceleration limit.

6. The method of claim 1, wherein changing the speed of the rotary compressor includes controlling a frequency of a current to an electric motor driving the rotary compressor to limit a rate of change in speed of the electric motor according to the selected acceleration/deceleration limit.

7. The method of claim 1, wherein changing the speed of the rotary compressor includes changing an accelerating/decelerating torque of the compressor by controlling an amount of current to an electric motor driving the rotary compressor while limiting the accelerating/decelerating torque of the electric motor according to the selected acceleration/deceleration limit.

8. The method of claim 1, wherein selecting the acceleration/deceleration limit includes selecting the acceleration/deceleration limit from a starting acceleration limit, a running acceleration limit, a running deceleration limit, and a stopping deceleration limit that are stored in a memory of a controller based upon the operating mode of the rotary compressor.

9. The method of claim 1 wherein changing the speed of the rotary compressor includes controlling a frequency of a current from a variable frequency drive to an electric motor of the rotary compressor to limit a rate of change in a speed of the electric motor according to the selected acceleration/deceleration limit.

10. The method of claim 1, wherein changing the speed of the rotary compressor includes changing an accelerating/decelerating torque of rotors of the rotary compressor by controlling an amount of current from a variable frequency drive to an electric motor of the rotary compressor to limit the accelerating/decelerating torque of the electric motor according to the selected acceleration/deceleration limit.

11. The method of claim 1, wherein the rotary compressor includes a permanent magnet electric motor to drive the rotary compressor and changing the speed of the rotary compressor includes adjusting a frequency of polyphase alternating current control signals to drive the permanent magnet motor according to the selected acceleration/deceleration limit.

* * * * *